(12) United States Patent
Mossman et al.

(10) Patent No.: US 8,061,114 B2
(45) Date of Patent: Nov. 22, 2011

(54) COMBINE HEAD FRAME

(75) Inventors: Michael Wayne Mossman, Silvis, IL (US); Michael Bennett Downey, Hampton, IL (US); Eric Hans Stone, Port Byron, IL (US)

(73) Assignee: Deere & Company, Moline, IL (US)

( * ) Notice: Subject to any disclaimer, the term of this patent is extended or adjusted under 35 U.S.C. 154(b) by 1169 days.

(21) Appl. No.: 11/588,665

(22) Filed: Oct. 26, 2006

(65) Prior Publication Data

US 2007/0186532 A1 Aug. 16, 2007

Related U.S. Application Data

(60) Provisional application No. 60/774,098, filed on Feb. 16, 2006.

(51) Int. Cl.
*A01D 45/02* (2006.01)
(52) U.S. Cl. .................. 56/51; 56/153; 56/208; 56/228; 56/320.1; 56/119
(58) Field of Classification Search .................. 56/14.9, 56/15.6, 119, 208–212
See application file for complete search history.

(56) References Cited

U.S. PATENT DOCUMENTS

| 2,875,568 | A | * | 3/1959 | Watamaker | 56/210 |
| 3,412,534 | A | * | 11/1968 | Teale | 56/16.4 R |
| 3,478,499 | A | * | 11/1969 | Van Der Lely | 56/11.9 |
| 4,296,879 | A | * | 10/1981 | Jordening | 224/510 |
| 4,409,780 | A | * | 10/1983 | Beougher et al. | 56/228 |
| 4,573,308 | A | * | 3/1986 | Ehrecke et al. | 56/14.4 |
| 6,029,429 | A | | 2/2000 | Fox et al. | |
| 6,272,823 | B1 | | 8/2001 | Yeomans | |
| 2005/0120694 | A1 | * | 6/2005 | Calmer | 56/14.7 |
| 2007/0193243 | A1 | * | 8/2007 | Schmidt et al. | 56/181 |

FOREIGN PATENT DOCUMENTS

WO 02102138 A 12/2002

OTHER PUBLICATIONS

European Search Report, dated Jun. 15, 2007, 4 pages.

* cited by examiner

*Primary Examiner* — Alicia Torres

(57) ABSTRACT

A combine head frame includes a laterally-extending upper beam adjacent to the top of the combine head and a laterally-extending lower beam adjacent to the bottom of the combine head. A left lateral beam has first and second ends, wherein the first end is coupled to a left central portion of the upper beam and the second end is coupled to a left end portion of the lower beam. A right lateral beam has third and fourth ends, wherein the third end is coupled to a right central portion of the upper beam and the fourth end is coupled to a right end portion of the lower beam.

26 Claims, 15 Drawing Sheets

COMBINE HEAD FRAME

This is a non-provisional application based upon U.S. provisional patent application Ser. No. 60/774,098, entitled CORN HEAD MAIN FRAME, filed Feb. 16, 2006.

FIELD OF THE INVENTION

This invention relates to an agricultural machine, and more particularly to frames for combine heads.

BACKGROUND OF THE INVENTION

A combine head is the structure mounted on the front of a combine harvester vehicle to gather crop materials, separate them from the ground, and convey them to a separating section typically disposed inside the vehicle itself.

Combine heads typically extend laterally across in front of the combine harvester vehicle itself a distance of 10 to 40 feet. Combine heads are typically supported on a 3 to 6 foot wide feeder house that extends forward from the front of the vehicle. Five to 15 feet of the combine head is cantilevered outward from each side of the feeder house.

Supporting this width of combine head on a narrow 3-6 foot width of feeder house requires that the frame of the combine head be extremely strong and stiff. Unfortunately, the stronger and stiffer the combine head is, the heavier it is, and the more force it applies against the ground. Impacts by the ground due to the inertial resistance of this large mass can damage the combine head or structures mounted on it that harvest crops.

Combine heads are typically constructed with a plurality of long beams that extend laterally from side to side across the entire combine. In one common prior art configuration, there is an elongated upper beam that extends across the top of the combine head, an elongated lower beam that extends across the bottom of the combine head directly below the upper beam, and an elongated row unit frame that extends across the bottom of the combine head forward of the lower beam and approximately at the same height. The row unit beam is typically coupled to the lower beam with several forwardly-extending brackets or gussets that are fixed at their forward ends to the row unit beam and at their rear ends to the lower beam.

Farm equipment manufacturers are under continuous pressure to increase the efficiency of their vehicles. Regarding combines, there is continuous pressure to increase the width of the combine head so it is able to harvest more rows of crop in a single pass. As the combine head is increased in width, however, all of the beams and other members that comprise its frame must be increased in size to handle the increased weight.

What is needed is an improved combine head frame that distributes forces in a manner that permits the frame members and the combine head generally to be reduced in weight.

SUMMARY OF THE INVENTION

The invention, in one form thereof, is directed to a combine head frame for a combine head. The combine head frame includes a laterally-extending upper beam adjacent to the top of the combine head and a laterally-extending lower beam adjacent to the bottom of the combine head. A left lateral beam has first and second ends, wherein the first end is coupled to a left central portion of the upper beam and the second end is coupled to a left end portion of the lower beam. A right lateral beam has third and fourth ends, wherein the third end is coupled to a right central portion of the upper beam and the fourth end is coupled to a right end portion of the lower beam.

The invention, in another form thereof, is directed to a combine head. The combine head includes a plurality of crop gathering units and a frame to which the plurality of crop gathering units is coupled. The frame includes a laterally-extending upper beam, a laterally-extending lower back beam, and a laterally extending row unit beam. A plurality of gussets extends between the row unit beam and the lower back beam. A plurality of diagonally extending frame members is coupled to the upper beam and the lower back beam.

The invention, in another form thereof, is directed to an agricultural machine. The agricultural machine includes a combine, and a combine head configured for support by the combine. The combine head includes a plurality of crop gathering units, and a frame to which the plurality of crop gathering units is coupled. The frame includes a laterally-extending upper beam adjacent to the top of the combine head and a laterally-extending lower beam adjacent to the bottom of the combine head. A left lateral beam extends diagonally between the upper beam and the lower beam, and has first and second ends, wherein the first end is coupled to a left central portion of the upper beam and the second end is coupled to a left end portion of the lower beam. A right lateral beam extends diagonally between the upper beam and the lower beam, and has third and fourth ends, wherein the third end is coupled to a right central portion of the upper beam and the fourth end is coupled to a right end portion of the lower beam.

BRIEF DESCRIPTION OF THE DRAWINGS

Each of the attached figures is a different view of a combine head and combine head frame taken from different vantage points around the structure. Each figure is oriented with respect to a common orthogonal coordinate system in which the X-axis extends from the origin toward the rear of the vehicle, combine head, and/or combine head frame in a longitudinal direction, the Z-axis extends from the origin vertically, and the Y-axis extends from the origin laterally, e.g., rightwardly, or orthogonal to the other two axes, across the combine vehicle, combine head, and/or combine head frame. The orientation of each picture with respect to the coordinate system is provided on the figures.

DETAILED DESCRIPTION OF THE INVENTION

Figure 1:
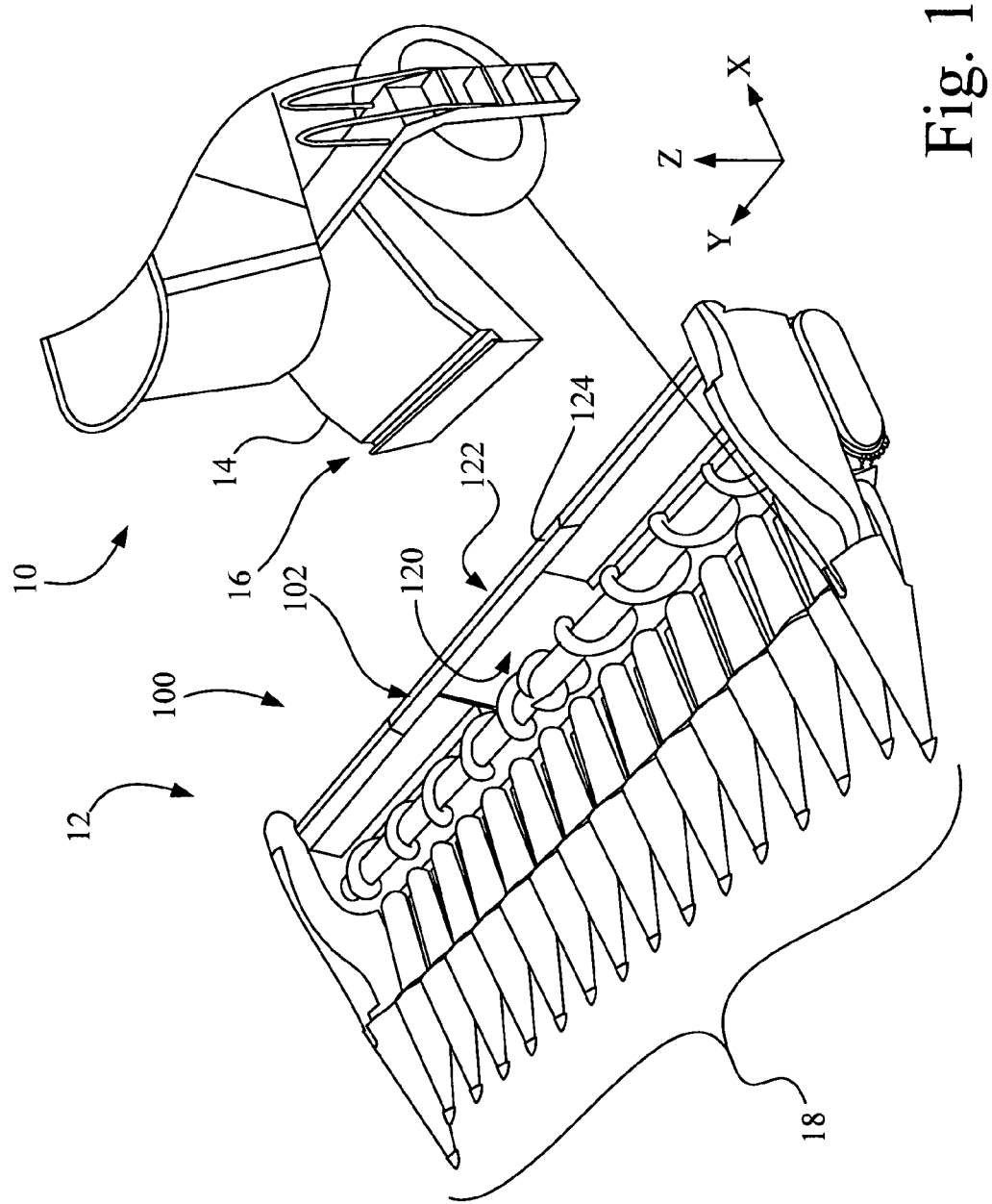
FIG. 1 is a perspective view of a combine and a combine head, with the combine head being configured in accordance with an embodiment of the present invention.

Referring now to the FIGURES, and particularly FIG. 1, there is shown a combine vehicle 10 and a combine head 12. Combine vehicle 10 includes a feeder house 14. Combine head 12 is supported on a front end 16 of feeder house 14 in a manner known in the art.

Figure 2:
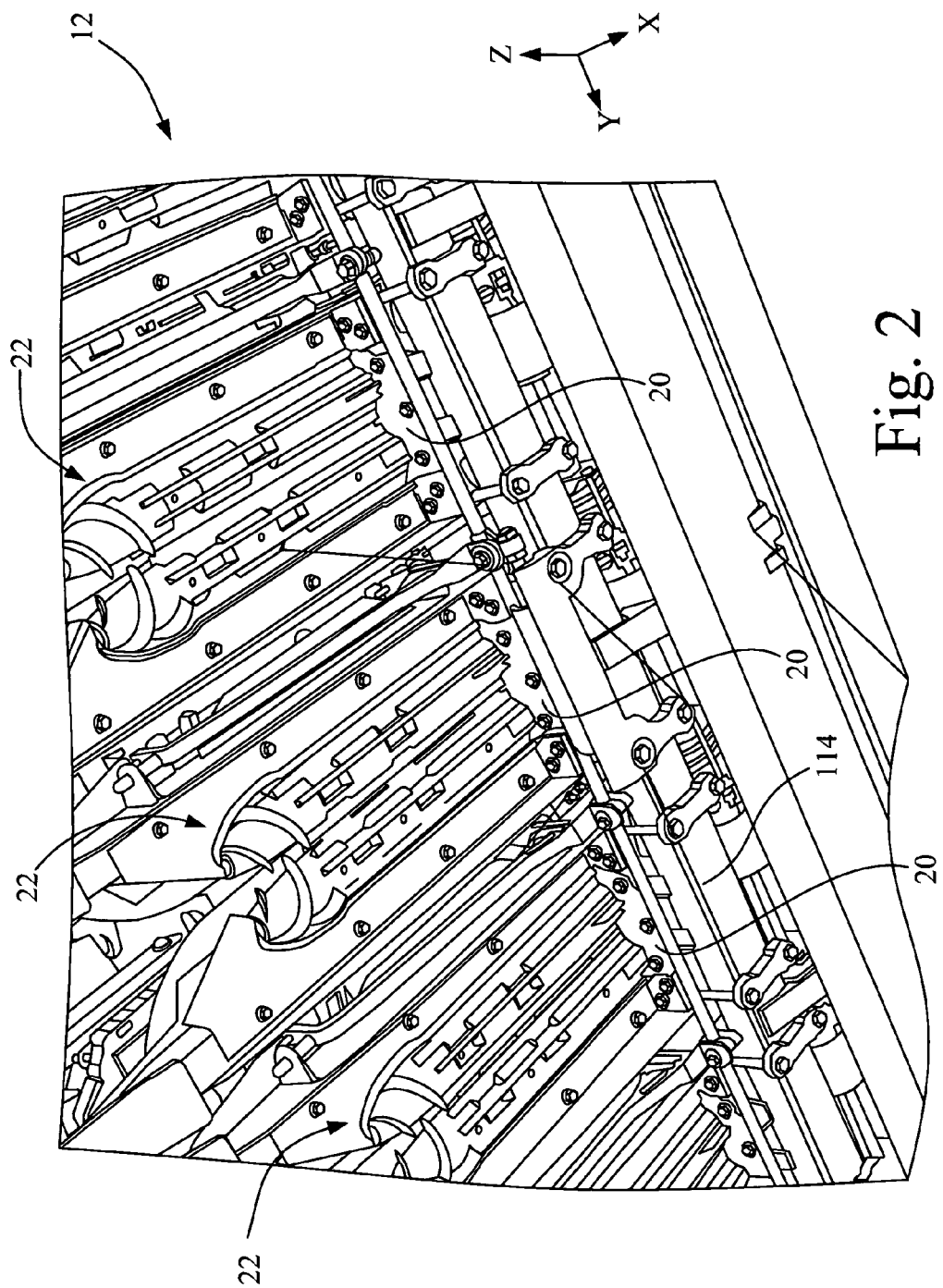
FIG. 2 is a bottom perspective view of a portion of the combine head of FIG. 1.
Figure 3:
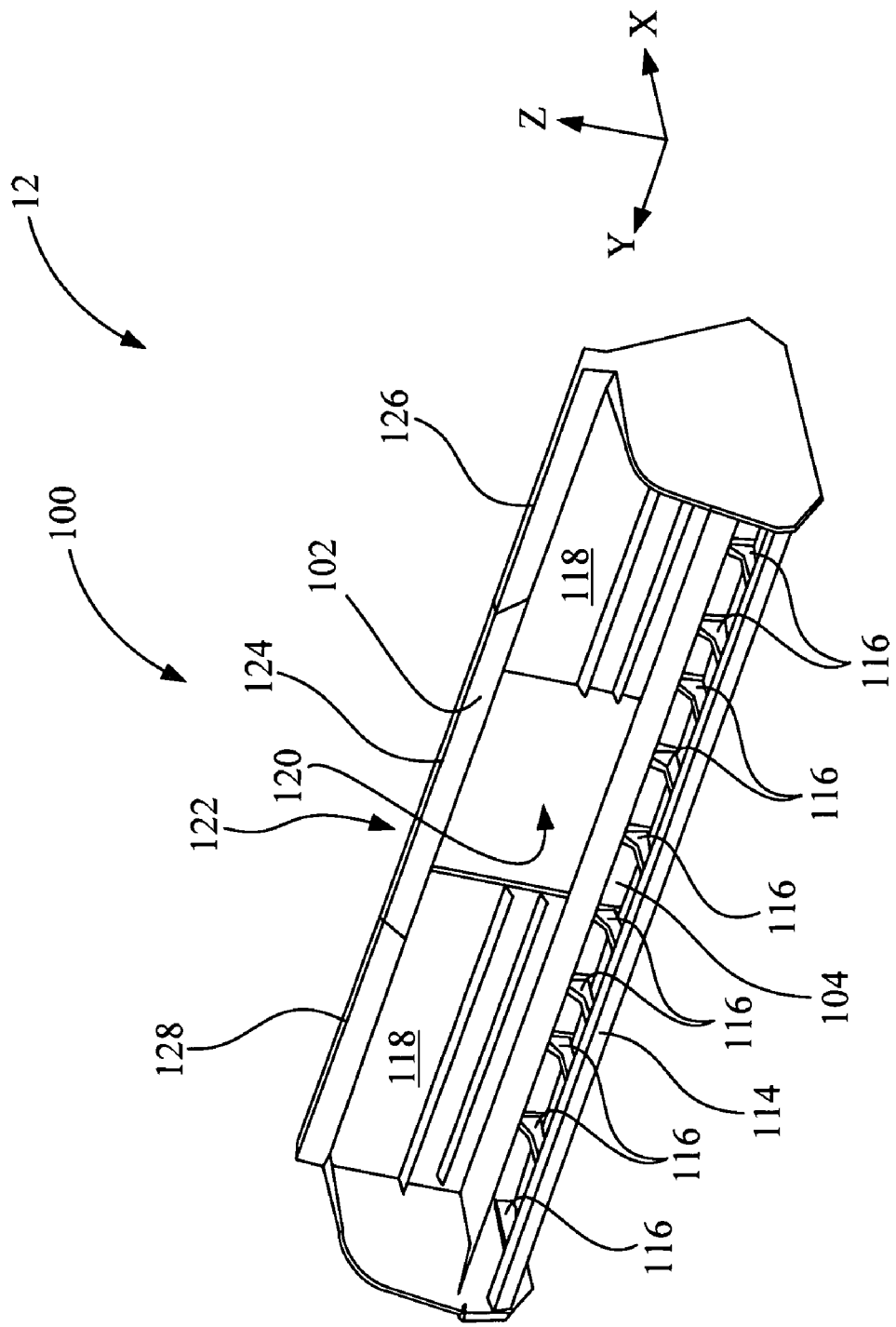
FIGS. 3-6 are various perspective views of the combine head frame of the combine head of FIG. 1.
Figure 4:
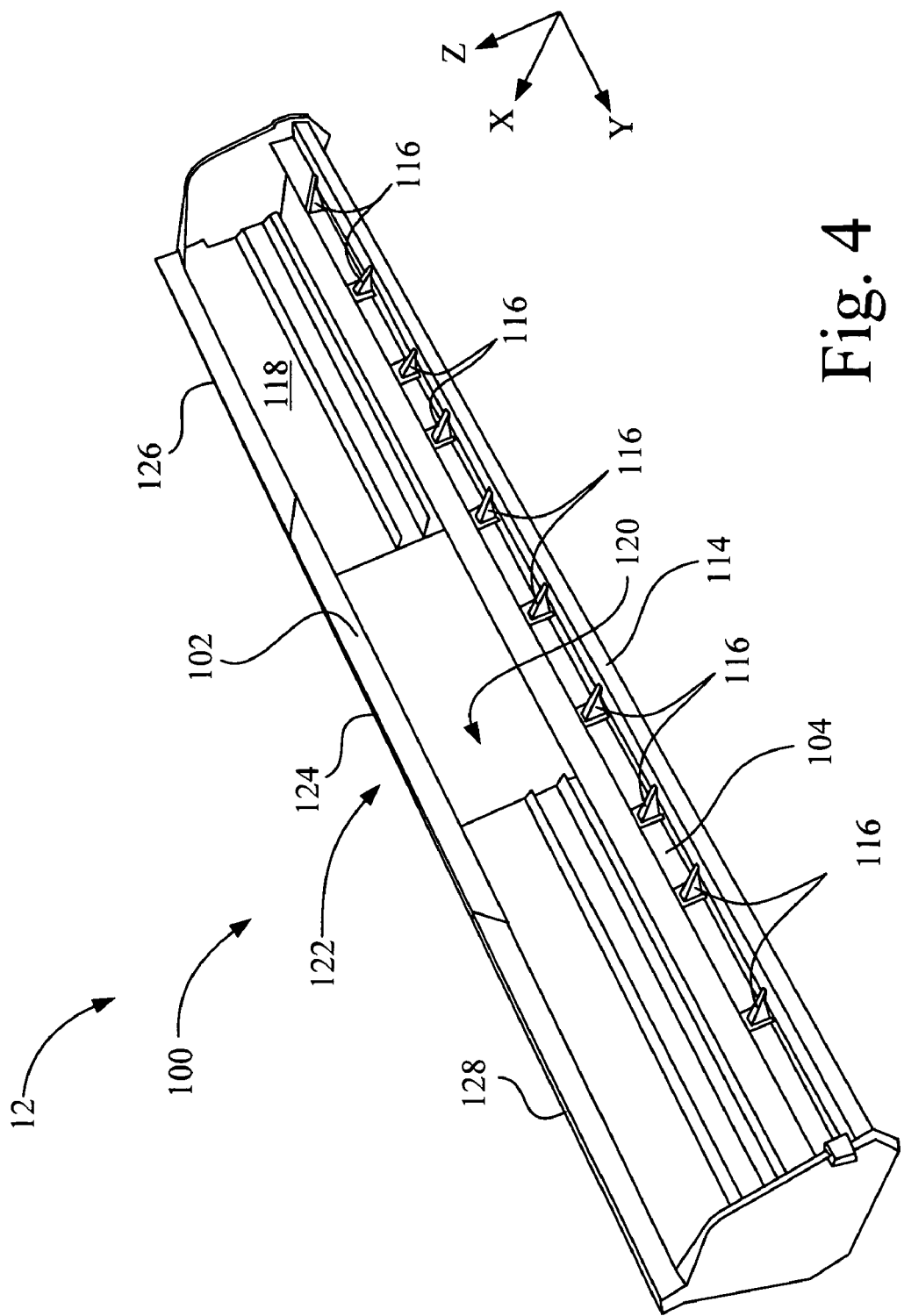
Figure 5:
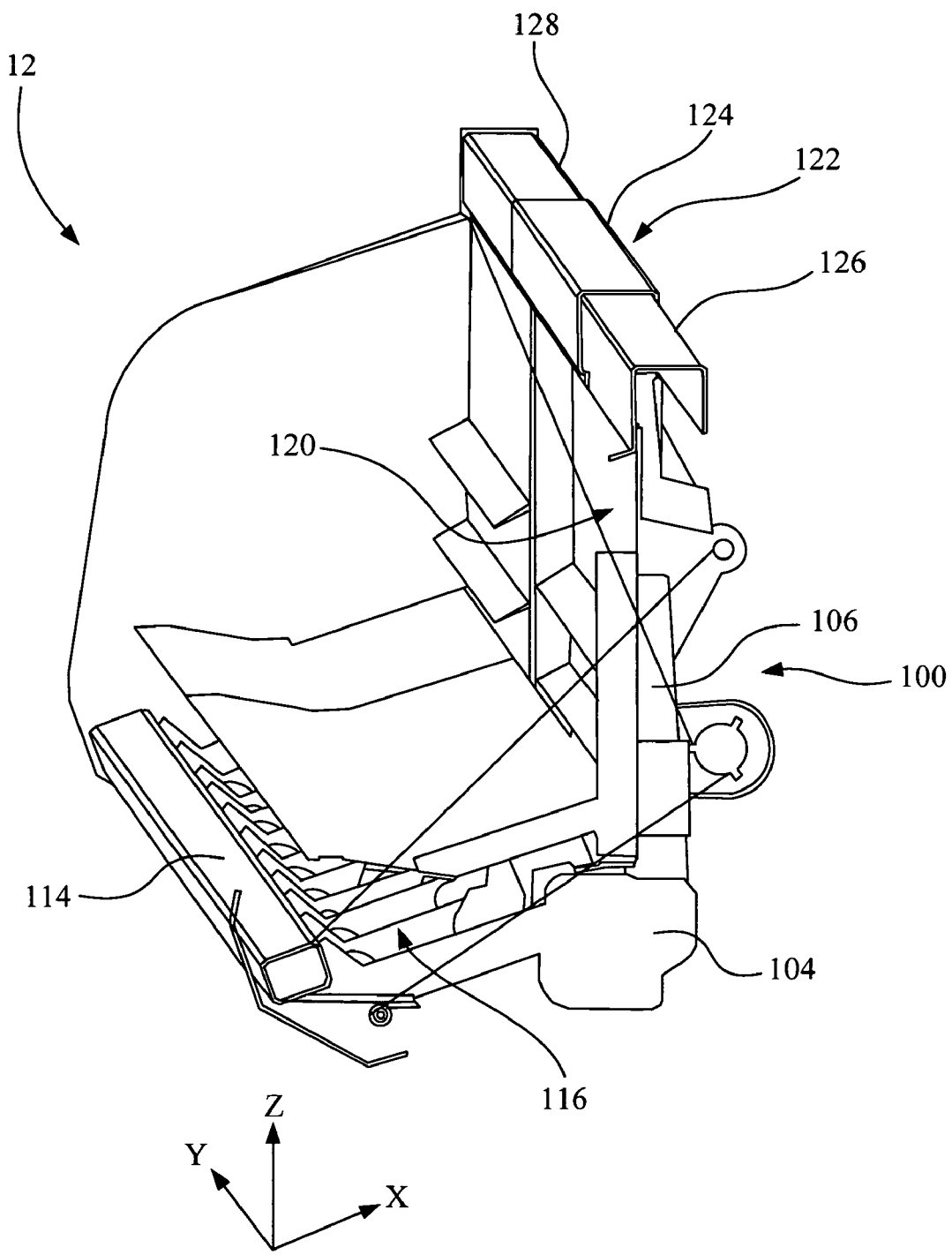
Figure 6:
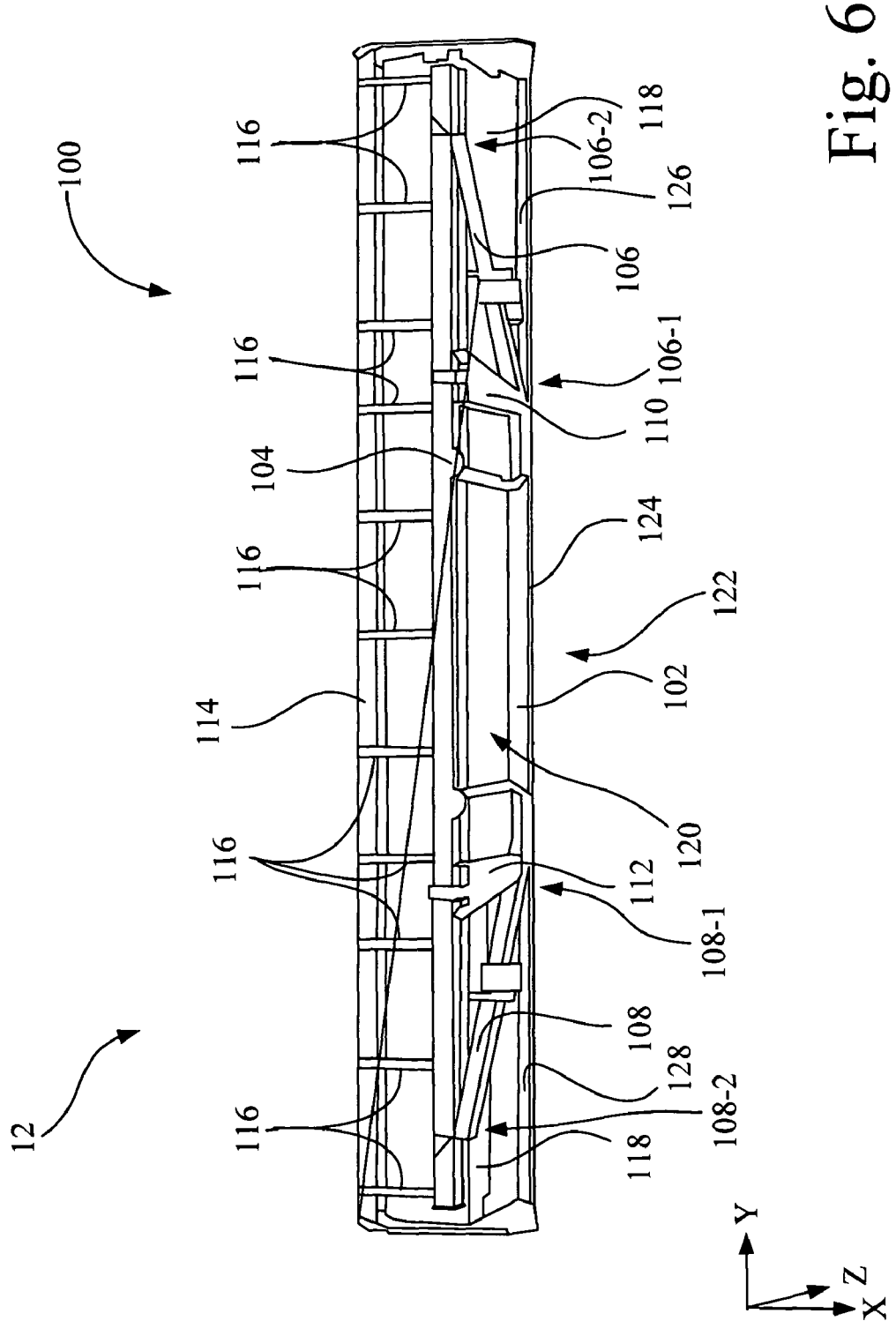
Figure 7:
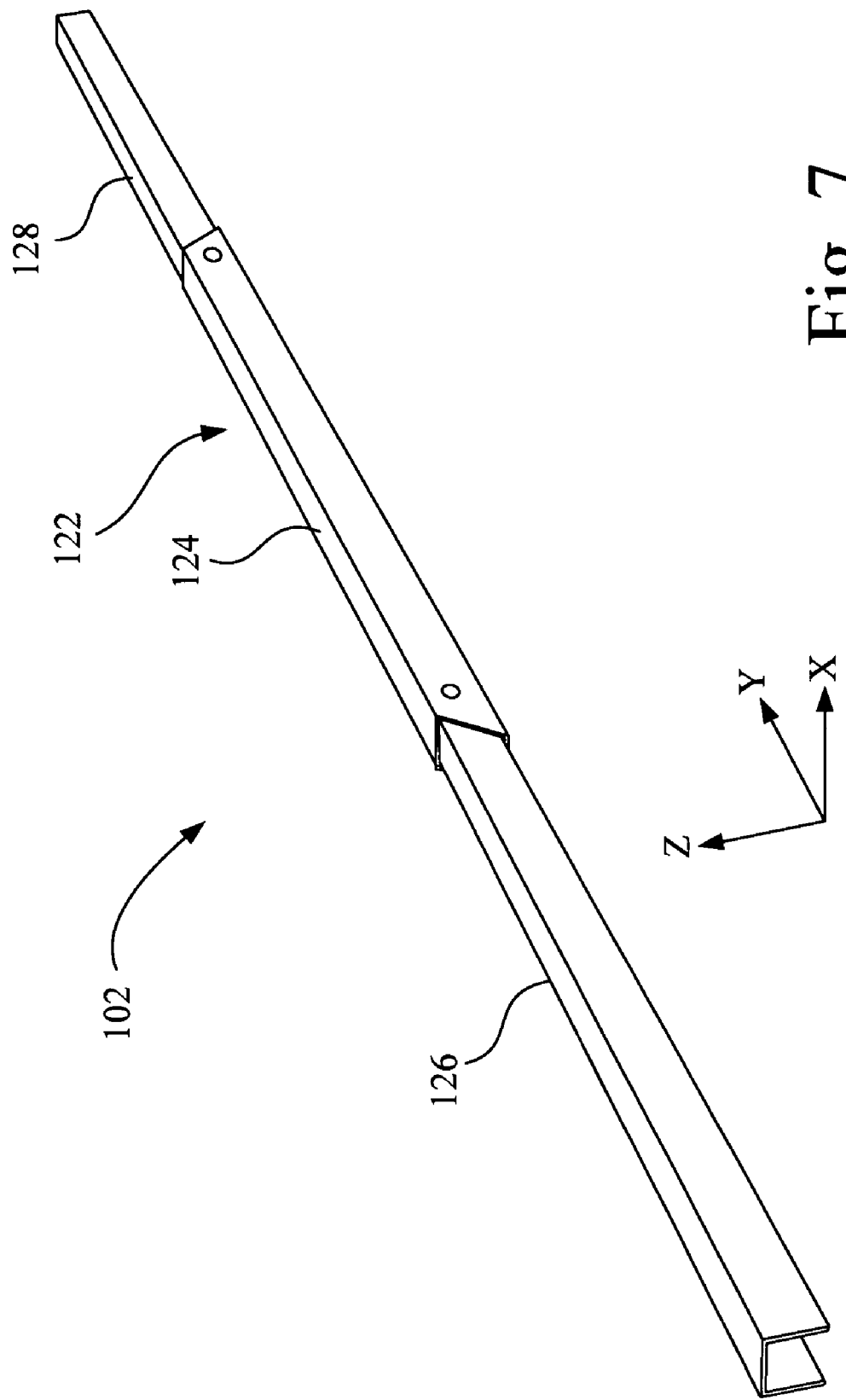
FIG. 7 is a perspective view of the upper beam of the combine head frame of FIGS. 3-6.
Figure 8:
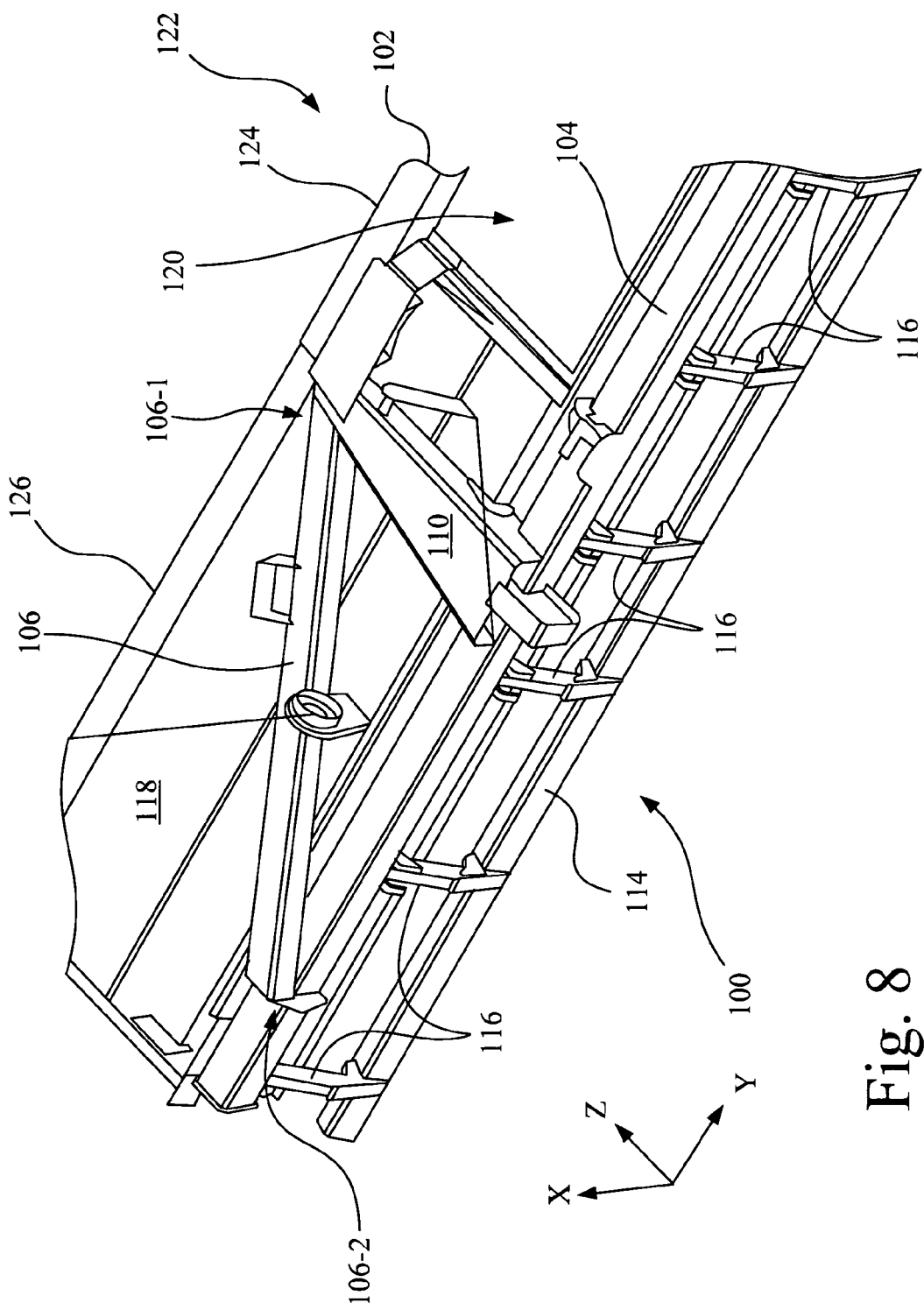
FIGS. 8-12 are enlarged perspective views of respective portions of the combine head frame of the combine head of FIG. 1.
Figure 9:
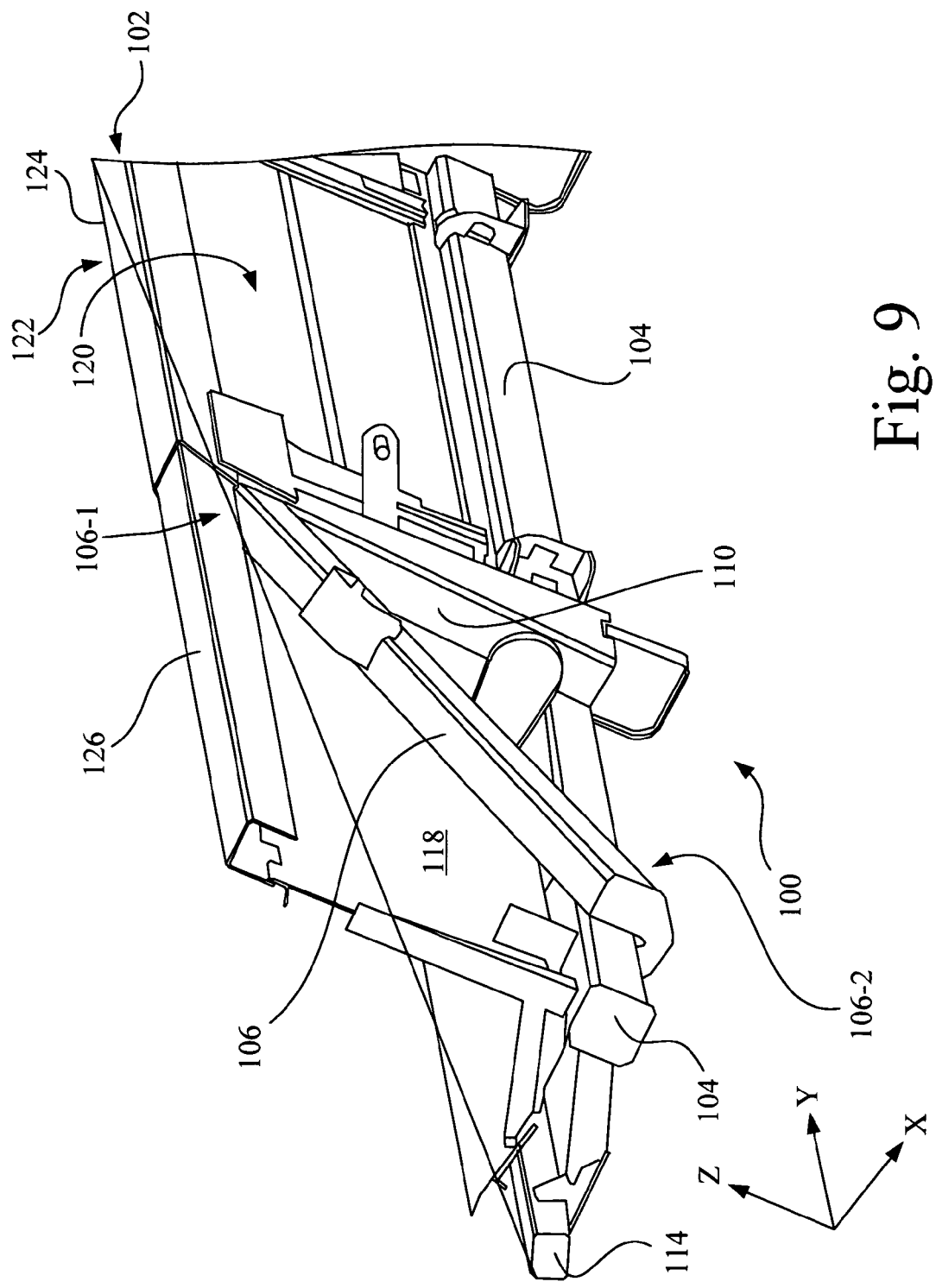
Figure 10:
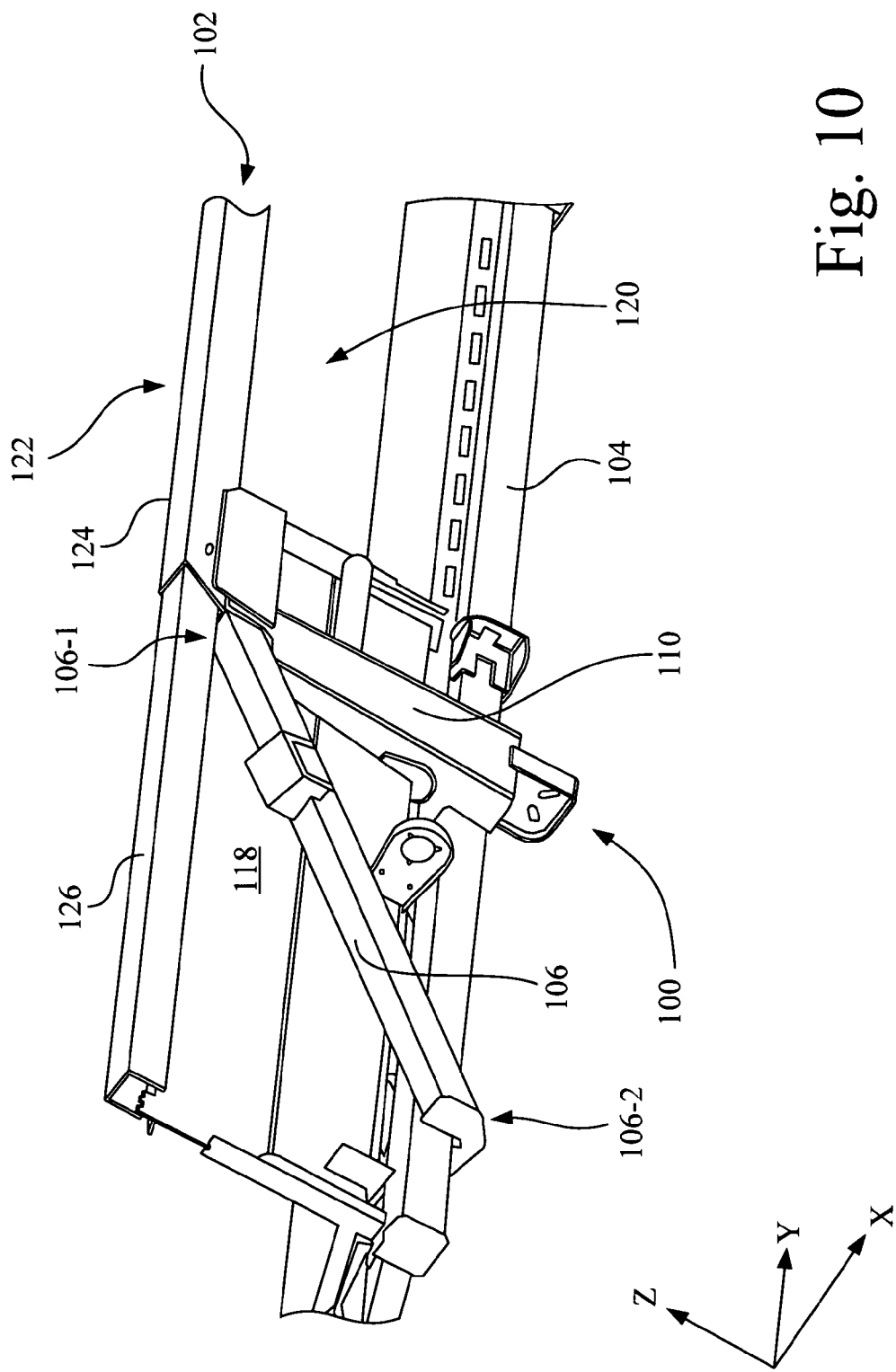
Figure 11:
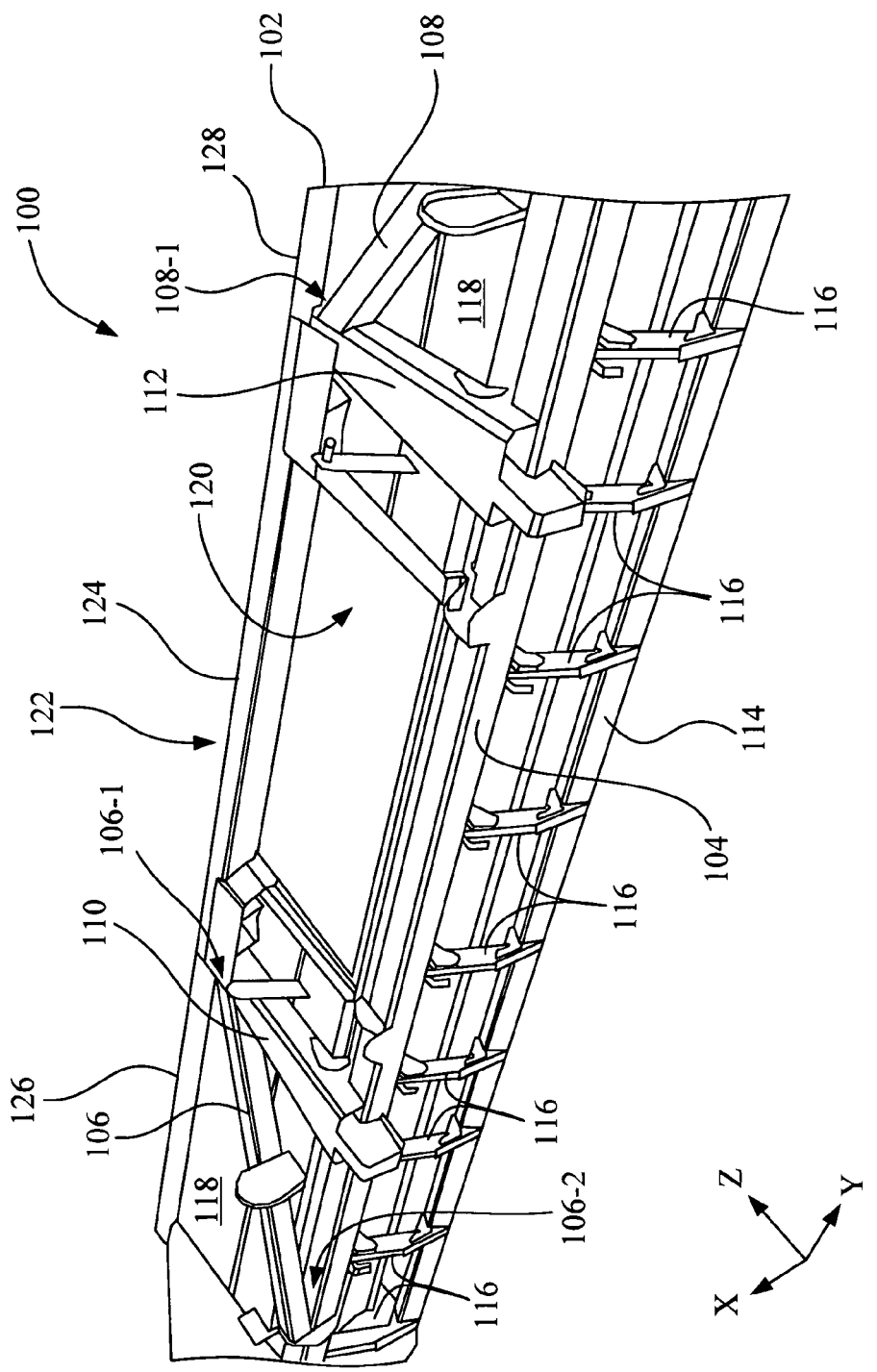
Figure 12:
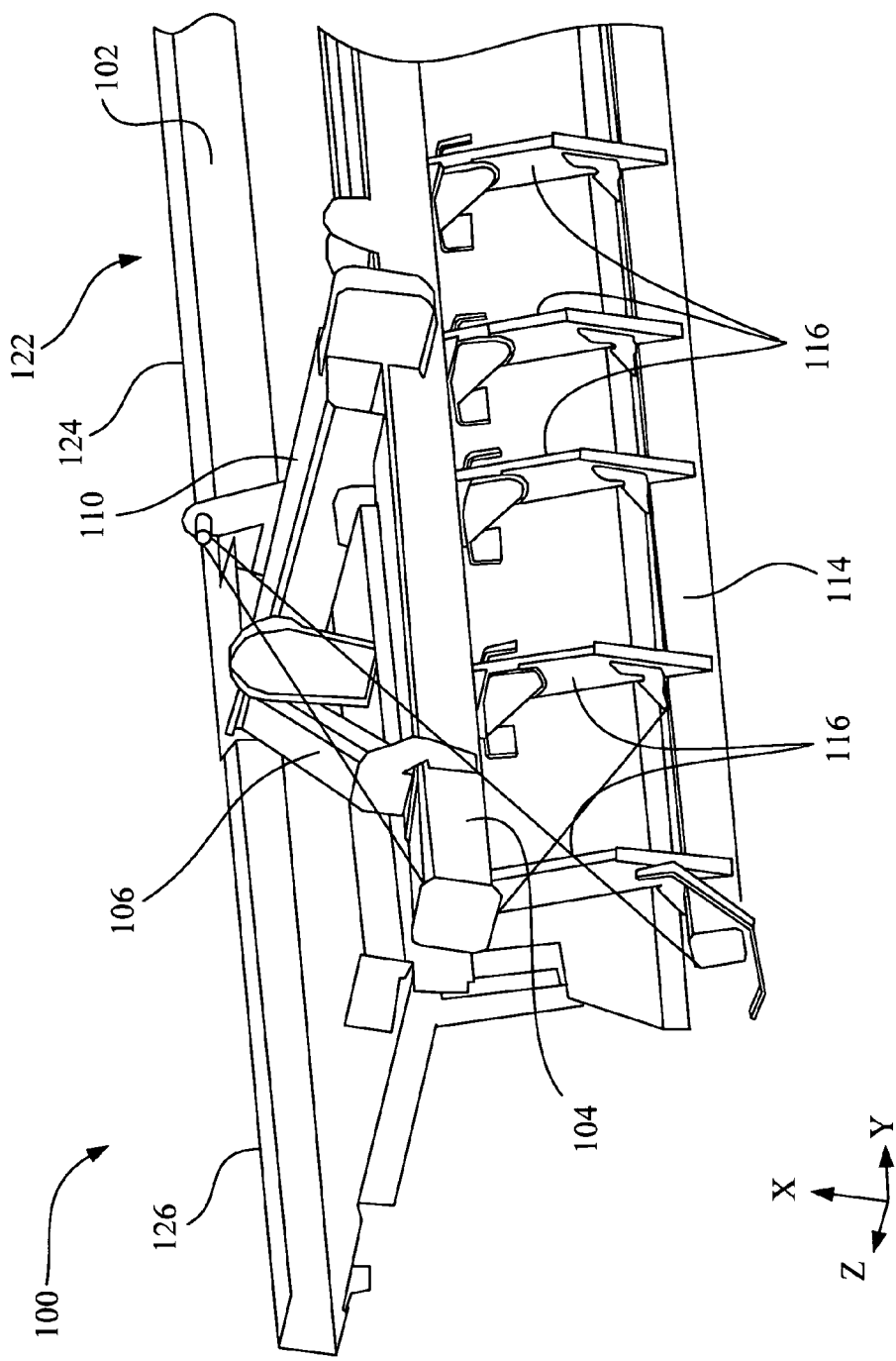

Combine head 12, such as a corn head in the embodiment shown in FIG. 1, includes a plurality of crop gathering units 18, e.g., corn head units. Referring also to FIG. 2, in an embodiment wherein the plurality of crop gathering units 18 are corn head units, each crop gathering unit of the plurality of crop gathering units 18 includes a sub-frame 20 to which harvesting components 22, such as for example a pair of stalk rolls, associated with each individual crop gathering unit are attached.

Combine head 12 includes a combine head frame 100 to which the plurality of crop gathering units 18 is attached. For example, each sub-frame 20 of the plurality of crop gathering units 18 is coupled to combine head frame 100, e.g., by bolts and brackets.

Referring also to FIGS. 3-12, combine head frame 100 includes a laterally-extending upper beam 102, a laterally-extending lower beam 104, left and right diagonal descending beams 106, 108, left and right vertical descending beams 110, 112, laterally-extending row unit beam 114, and a plurality of fore-and-aft extending brackets or gussets 116. Upper beam 102 is adjacent to the top of combine head 12, and lower beam 104 is adjacent to the bottom of combine head 12. As shown in the Figs., in the present embodiment upper beam 102 and lower beam 104 are substantially equal in length. Also as shown in the Figs., laterally-extending upper beam 102, laterally-extending lower beam 104, and laterally-extending row unit beam 114 extend in the direction of the Y-axis. Frame 100 also includes a rear wall 118 that is fixed to beams 102, 104, 106, 108, 110, and 112.

Figure 13:
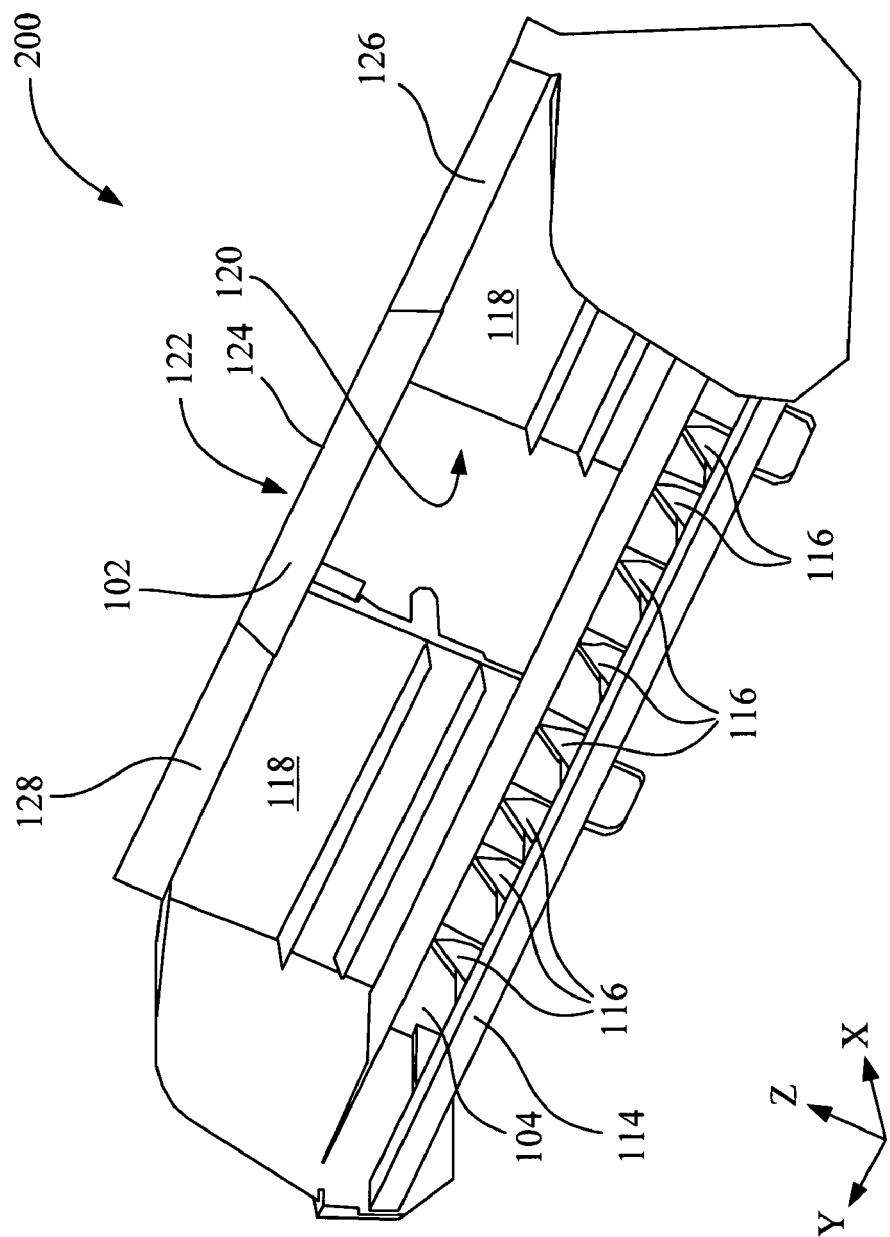
FIGS. 13 and 14 are perspective views of another embodiment of a combine head having a lateral extent, i.e., width, shorter than the combine head of FIG. 1.
Figure 14:
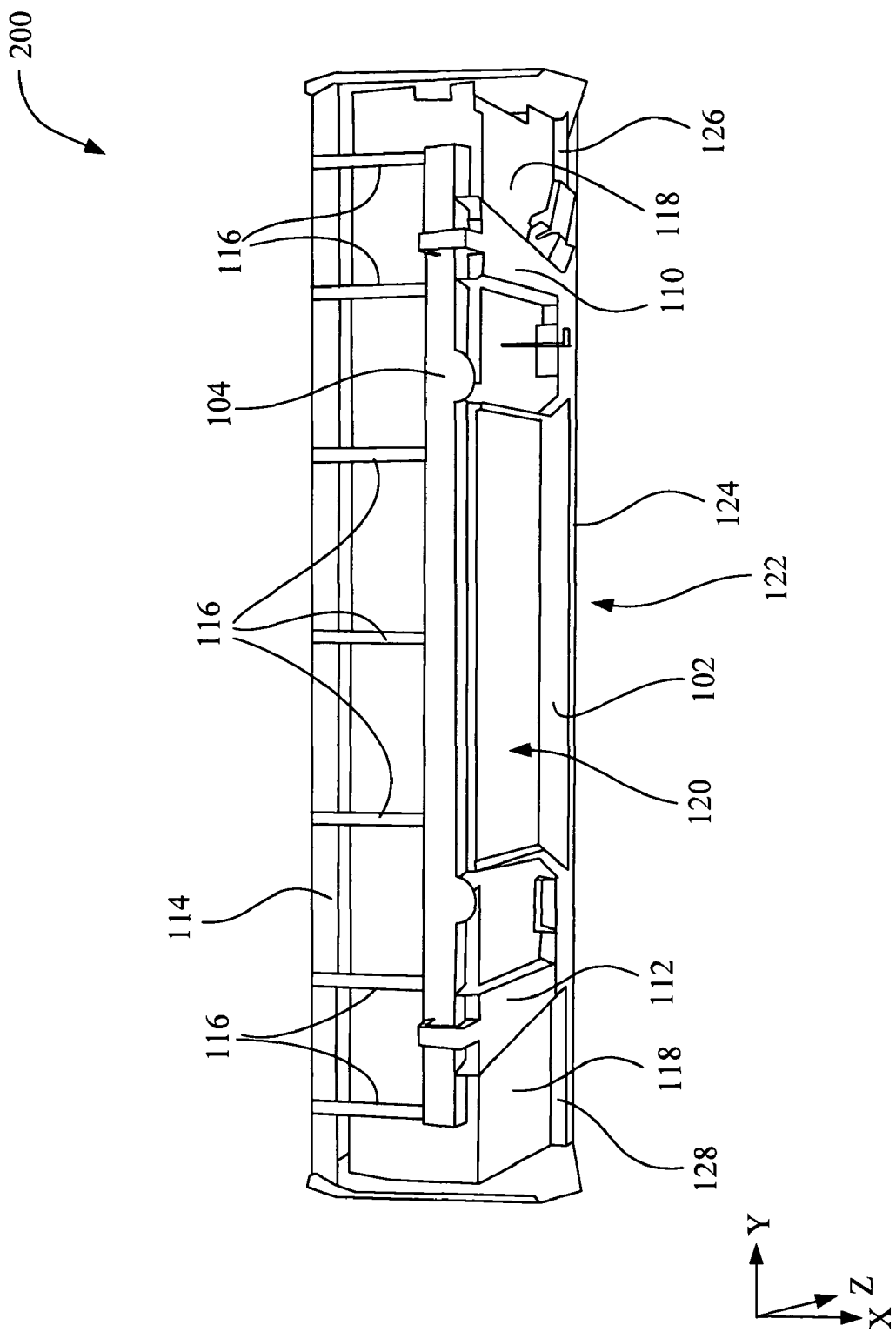

FIGS. 13 and 14 shows a combine head frame 200 with the left and right diagonal descending beams 106, 108 omitted, and relying primarily on the trapezoidal shaped left and right vertical descending beams 110, 112 for the required support.

Referring again to the embodiment of FIGS. 1-12, frame 100 defines a rectangular aperture or opening 120 that receives the front end 16 of feeder house 14 that extends from the front of combine vehicle 10. In particular, the combine head 12 is supported by a central portion 122 of upper beam 102. It is this central portion 122 that supports the weight of combine head 12 and transfers it to feeder house 14 and thence to combine vehicle 10 itself.

In traditional prior art construction, upper beam 102 is a single elongate rectangular (or circular) beam that extends from one side of the combine head to the other. Prior art upper beams are made of standard rectangular or circular steel tube stock and have a constant cross-section over their entire lateral length. In the present embodiment illustrated herein, upper beam 102 (see, e.g., FIG. 7) is not made of a single elongated rectangular or round tube, but is constructed from at least three different components that are welded together. The first of these components is a first elongate central member 124 that extends across the top of the aperture 120. Central member 124 forms the central section of the upper beam 102 and is preferably made of rectangular or circular steel tube stock. Upper beam 102 also includes two additional members, a left extension member 126 and a right extension member 128 that are welded to central member 124 to form a single elongate upper beam 102.

Left and right members 126, 128 are not as strong as central member 124. In addition, they weigh less per unit of length than central member 124. Left and right members 126, 128 are preferably inverted U-shaped members having an open bottom, left and right sides (as viewed end-on), and a top surface joined to the left and right sides.

This inhomogeneous beam construction of a stronger and thicker central portion 122 from which weaker and lighter wing portions extend provides a substantial reduction in weight. It also transfers an additional load to lower beam 104 since the left and right members 126, 128 do not support as much weight.

To help offset the additional load applied to lower back beam 104, left and right diagonal descending beams 106, 108 are provided. Left beam 106 is welded at its upper end 106-1 to the upper portions of frame 100, and preferably to upper beam 102 adjacent to the junction of central member 124 to left member 126. Left beam 106 descends downward and leftward and is welded at its bottom end 106-2 to lower portions of frame 100 adjacent to the left end of lower beam 104, and preferably to lower beam 104 itself. In a similar fashion, right beam 108 is welded at its upper end 108-1 to the upper portions of frame 100, and preferably to upper beam 102 adjacent to the junction of central member 124 to right member 128. Right beam 108 descends downward and rightward and is welded at its bottom end 108-2 to lower portions of frame 100 adjacent to the right end of lower beam 104, and preferably to lower beam 104 itself. As shown, for example, in FIGS. 9 and 10, lower beam 104 may have a cross-sectional shape that is polygonal, e.g., rectangular.

Left and right diagonally descending beams 106, 108 are preferably steel tubes, preferably rectangular or alternatively circular. In an alternative embodiment, beams 106, 108 are preferably U-shaped beams that open forward, with their open sides facing the backside of rear wall 118, or downward with their open sides facing the ground.

Frame 100 also includes left and right vertical descending beams 110, 112. Beams 110, 112 are welded to the upper portions of frame 100 at their upper ends adjacent to the left and right junctions of central member 124 and left and right members 126, 128, respectively. Beams 110, 112 extend vertically downward and are welded at their lower ends to lower portions of frame 100, and preferably to lower beam 104 adjacent to the aperture. Beams 110, 112 are preferably U-shaped, having an open side that faces rear wall 118 and two sidewalls that are spaced in increasingly wider distance apart as one descends along each beam 110, 112.

Figure 15:
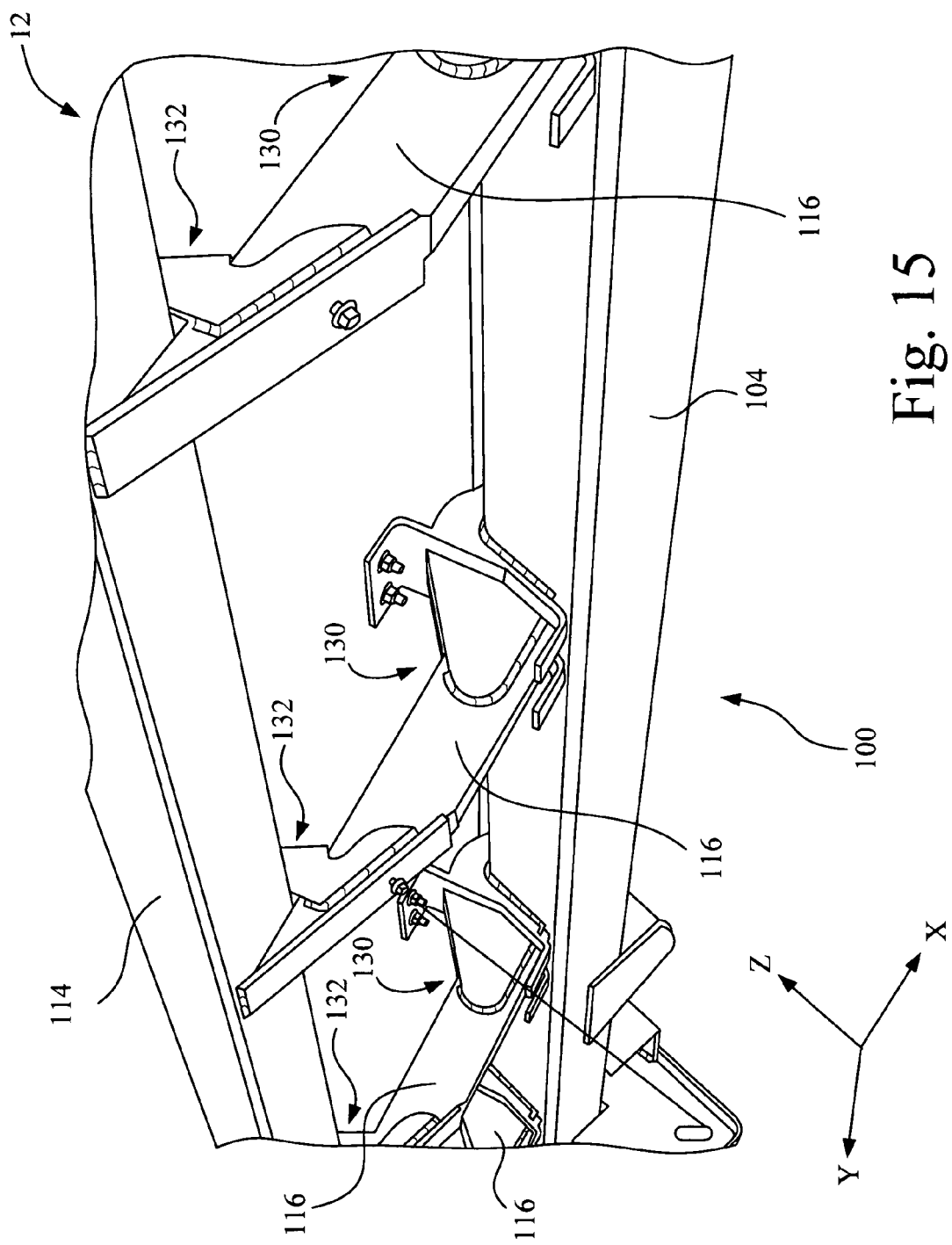
FIG. 15 is a bottom perspective view illustrating the gussets that extend between the lower back beam and the row unit beam in embodiments of the combine heads.

Referring also to FIG. 15, the plurality of gussets 116 extend fore-and-aft (e.g., generally in a direction of the X-axis) between each of row unit beam 114 and lower back beam 104. Each gusset of the plurality of gussets 116 has a proximal end 130 coupled to lower back beam 104 and has a distal end 132 coupled to row unit beam 114. With respect to the plurality of gussets 116, the coupling may be in the form of a welded attachment.

The plurality of gussets 116 are spaced along a lateral extent of lower beam 104 and a lateral extent of row unit beam 114. Referring again to FIG. 2, the plurality of crop gathering units 18 are spaced along the lateral extent of the row unit beam 114, with each crop gathering unit of the plurality of crop gathering units 18 being coupled to the row unit beam 114 of combine head frame 100. The spacing of the plurality of gussets 116 along the lateral extent of the row unit beam 114 is predetermined to accommodate a spacing of the plurality of crop gathering units 18. For example, the spacing of the plurality of gussets 116 may be designed to be applied uniformly to various combine heads of various lengths such that, for example, the spacing of the plurality of gussets 116 of combine head frame 100 of combine head 12 is the same as the spacing of the plurality of gussets 116 of combine head frame 200, even though the lateral extent, e.g., in the direction of the Y-axis, of combine head frame 100, and in turn combine head 12, is longer than the lateral extent of combine head frame 200.

Having described the preferred embodiment, it will become apparent that various modifications can be made without departing from the scope of the invention as defined in the accompanying claims.

What is claimed is:

1. A combine head frame for a combine head, comprising:
a laterally-extending upper beam adjacent to the top of the combine head;
a laterally-extending lower beam adjacent to the bottom of the combine head;
a left lateral beam having first and second ends, wherein the first end is coupled directly to a left central portion of the upper beam and the second end is coupled directly to a left end portion of the lower beam; and
a right lateral beam having third and fourth ends, wherein the third end is coupled directly to a right central portion of the upper beam and the fourth end is coupled directly to a right end portion of the lower beam.

2. The combine head frame of claim 1, wherein the upper beam further comprises a left portion, a central portion and a right portion welded together to form a single elongate member.

3. The combine head frame of claim 2, wherein the left portion and the right portion are lighter per unit length than the central portion.

4. The combine head frame of claim 2, wherein the central portion is tubular in longitudinal cross-section and the left and right portions are not tubular.

5. The combine head frame of claim 2, wherein the central portion comprises a rectangular tube and the left and right portions comprise U-shaped members.

6. The combine head frame of claim 1, further comprising left and right vertical beams having upper and lower ends, wherein the upper ends of the left and right vertical beams are coupled to the upper beam on left and right sides, respectively, of a central aperture in the frame for receiving a feeder house, and further wherein the lower ends of the left and right vertical beams are coupled to the lower beam on left and right sides, respectively, of the central aperture.

7. The combine head frame of claim 6, wherein the left and right vertical beams are U-shaped in cross-section and open forwardly and have opposite sides diverging from said upper end to said lower end.

8. The combine head frame of claim 1, further comprising:
a laterally extending row unit beam; and
a plurality of gussets extending fore-and-aft between the row unit beam and the lower beam, each gusset of the plurality of gussets having a proximal end coupled to the lower beam and having a distal end coupled to the row unit beam.

9. The combine head frame of claim 8, wherein the plurality of gussets are spaced along a lateral extent of the lower beam and a lateral extent of the row unit beam.

10. The combine head frame of claim 9, wherein the spacing of the plurality of gussets is designed to be applied uniformly to various combine heads of various lengths.

11. A combine head, comprising:
a plurality of crop gathering units; and
a frame to which the plurality of crop gathering units is coupled, wherein the frame includes:
a laterally-extending upper beam;
a laterally-extending lower back beam; and
right and left diagonally extending beams having respective first ends coupled directly to right and left central locations of said upper beam, and having respective second ends coupled directly to right and left outer locations of said back beam, whereby each of said right and left diagonally extending beams extend downwardly and outwardly from said upper beam.

12. The combine head of claim 11, wherein the upper beam includes a left portion, a central portion and a right portion welded together to form a single elongate member.

13. The combine head of claim 12, wherein the left portion and the right portion are lighter per unit length than the central portion.

14. The combine head of claim 12, wherein the central portion is tubular in longitudinal cross-section, and each of the left portion and right portion is not tubular.

15. The combine head of claim 12, wherein the central portion comprises a rectangular tube, and each of the left portion and the right portion comprises a U-shaped member.

16. The combine head of claim 11, further comprising left and right vertical beams having upper and lower ends, wherein the upper ends of the left and right vertical beams are coupled directly to the upper beam on left and right sides, respectively, of a central aperture in the frame for receiving a feeder house, and further wherein the lower ends of the left and right vertical beams are coupled directly to the lower back beam on left and right sides, respectively, of the central aperture.

17. The combine head of claim 16, wherein the left and right vertical beams are U-shaped in cross-section and open forwardly and have opposite sides diverging from said upper end to said lower end.

18. The combine head of claim 11, wherein the frame defines a central feeder house opening located between the right and left diagonally extending beams.

19. The combine head of claim 11, wherein a cross-sectional shape of the lower back beam is polygonal.

20. The combine head of claim 11, further comprising:
a laterally extending row unit beam spaced forwardly of said lower back beam; and
a plurality of gussets extending between the row unit beam and the lower back beam, and spaced along a lateral extent of the lower back beam and a lateral extent of the row unit beam, each gusset of the plurality of gussets having a proximal end coupled directly to the lower back beam and having a distal end coupled directly to the row unit beam, and wherein the plurality of crop gathering units are spaced along the lateral extent of the row unit beam, with each crop gathering unit of the plurality of crop gathering units being coupled to the row unit beam.

21. The combine head of claim 20, wherein a spacing of the plurality of gussets along the lateral extent of the row unit beam is predetermined to accommodate a spacing of the plurality of crop gathering units.

22. The combine head of claim 20, wherein the spacing of the plurality of gussets is designed to be applied uniformly to various combine heads of various lengths.

23. An agricultural machine, comprising:
a combine; and
a combine head configured for support by the combine, wherein the combine head includes a plurality of crop gathering units, and a frame to which the plurality of crop gathering units is coupled, wherein the frame includes:
a laterally-extending upper beam adjacent to the top of the combine head;

a laterally-extending lower beam adjacent to the bottom of the combine head;

a left lateral beam extending diagonally between the upper beam and the lower beam, and having first and second ends, wherein the first end is coupled directly to a left central portion of the upper beam and the second end is coupled directly to a left end portion of the lower beam; and a right lateral beam extending diagonally between the upper beam and the lower beam, and having third and fourth ends, wherein the third end is coupled directly to a right central portion of the upper beam and the fourth end is coupled directly to a right end portion of the lower beam.

24. The agricultural machine of claim 23, wherein the upper beam includes a left portion, a central portion and a right portion welded together to form a single elongate member.

25. The agricultural machine of claim 23, further comprising:

a laterally extending row unit beam, and wherein the plurality of crop gathering units are spaced along the lateral extent of the row unit beam, with each crop gathering unit of the plurality of crop gathering units being coupled to the row unit beam; and a plurality of gussets extending between the row unit beam and the lower beam, and spaced along a lateral extent of the lower beam and a lateral extent of the row unit beam, each gusset of the plurality of gussets having a proximal end coupled to the lower beam and having a distal end coupled to the row unit beam, wherein the spacing of the plurality of gussets is designed to be applied uniformly to various combine heads of various lengths.

26. The agricultural machine of claim 23 wherein said upper beam includes a left portion, a central portion and a right portion, with said left and right portions being respectively joined to left and right ends of said central portion and having a weight per unit length which is less than the weight per unit length of said central portion; and said first end of said left lateral beam being coupled to said upper beam at a location adjacent said left end of said central portion; and said third end of said right lateral beam being coupled to said upper beam at a location adjacent said right end of said central portion.

* * * * *